Jan. 12, 1954    L. L. BRADBERRY    2,665,511
FISHING LURE
Filed May 1, 1951

INVENTOR
LEON L. BRADBERRY
BY
ATTORNEY

Patented Jan. 12, 1954

2,665,511

UNITED STATES PATENT OFFICE 2,665,511

FISHING LURE

Leon L. Bradberry, Berkeley, Calif.

Application May 1, 1951, Serial No. 224,044

1 Claim. (Cl. 43—41)

My invention relates to a new and improved lure for use in angling and, more particularly, to a fishing lure of the plug type which is readily adaptable to be employed under various diverse conditions.

A great many variables such as light conditions, water turbidity, natural feeding habits, individual species idiosyncrasies and others influence the selection of a suitable fishing lure. Accordingly, anglers are required to carry a sizeable variety of lures to offset or take advantage of the particular conditions encountered.

Game fish in general and particularly the larger and more energetic fish prefer and avidly pursue such natural foods as minnows, frogs and insects and also, with a lessened degree of enthusiasm, fall upon artificial lures which simulate the natural baits. Among the most widely employed type of artificial lures are the casting and trolling plugs which are made in an infinite variety of shapes and colors designed to simulate movements and appearances of natural and attractive baits. Moreover, individual plugs may be designed to operate on the surface or submerged. Such plugs generally perform well under only a limited set of conditions and, accordingly, the angler is forced to carry a sizeable number of the individual types to meet the varied conditions.

Despite the great attractive power which natural baits such as live minnows, frogs and others exhibit for game fish, the use of such baits is often foregone due to various difficulties attendant upon such use. For example, as usually employed, i. e., as strung upon a hook or enmeshed in the usual harness, the live bait dies rapidly and thereby loses its effectiveness or is most certainly destroyed by a single onslaught by an attacking game fish. As a result of these difficulties many fishermen forego the use of such effective bait and resort to use of the artificial plugs.

A great portion of the attractive power of the bait fish or other live bait may be attributed to the skin and scale surface sheen and general appearance which manufacturers of artificial plugs go to considerable effort and expense in attempt to duplicate. For example, silvery minnows and colored shiny fish such as goldfish are the baits of choice for certain game fish including the many varieties of bass, salmon, muskelunge and many varieties of ocean fish. Therefore, it may be seen that a lure which is capable of attractively displaying live baits and which also may be easily adapted to display a variety of surface finishes and colors would be a welcome and most useful device to the angler.

The fishing plug lure of my invention includes an elongated hollow transparent body portion which is adapted to receive a variety of inserts including live baits or inanimate materials thereby to create a maximum attractive effect to induce a game fish to strike the lure. Moreover, there may be positioned therein a magnifying element which is particularly effective in attracting the fish. Further the body of the lure is provided with means for attaching the lure to a fishing line and for attaching fish hooks thereto in order to catch the striking fish as will be more fully described hereinafter.

Accordingly it is an object of my invention to provide a fishing lure of the plug type having a transparent hollow body portion adapted to receive a variety of inserts whereby the attractiveness of such lure may be varied to meet diverse field conditions.

Another object of my invention is to provide a plug type fishing lure which is adapted to receive a live bait such as a live minnow and to effectively display such bait as to cause a game fish to strike the lure.

A further object of my invention is to provide a plug type fishing lure having a hollow transparent body which is adapted to receive and display a live minnow, so as to induce a game fish to strike the lure, to circulate water therethrough to preserve the minnow in live condition protected from direct assault by the striking fish and to cause the plug to sink beneath the surface.

Still another object of my inventon is to provide a plug type fishing lure having an elongated hollow transparent body constructed as separable halves to allow insertion of attractive materials therein which body is provided with means for attachment to a fishing line and for the attachment of hooks, is constructed with ports through which water may circulate with the plug submerged and in which provision is made for closing said ports thereby rendering the lure buoyant and operable on the surface.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to the drawing.

Figures 1, 3:
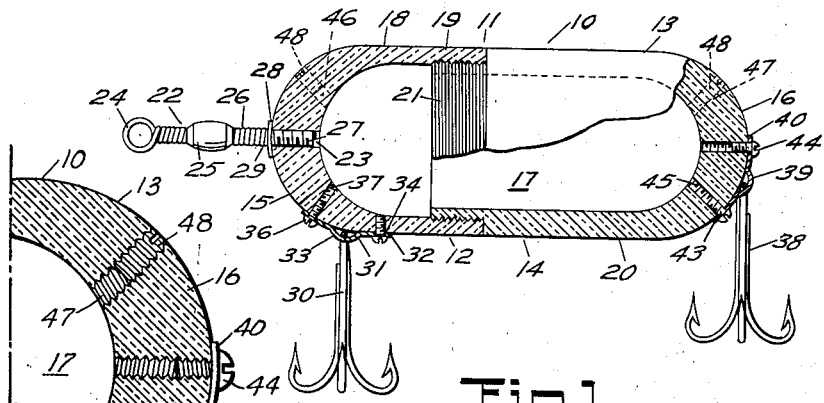
Figure 1 is a vertical longitudinal sectional view of the fishing lure of my invention.
Figure 3 is an enlarged fragmentary view of the upper rear portion of the lure taken on the plane of the line 3—3 of Fig. 2.
Figure 4:
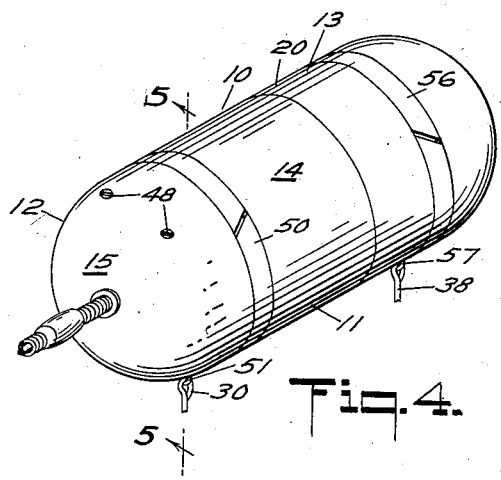
Figure 4 is a perspective view of a modified form of the fishing lure of my invention.

As may best be seen by reference to Figures 1 and 4 of the drawing, my fishing plug lure 10 includes an elongated, closed hollow body 11 and is constructed of a forward portion 12 separably joined to a rearward portion 13 whereby the exterior configuration of the body 11 presents a generally cylindrical central body portion 14 terminating forwardly in a hemispherically rounded nose portion 15 and rearwardly in a similarly hemispherically rounded end portion 16. The cavity 17 of the hollow body 11 is generally of a configuration similar to that of the exterior surfaces thereby yielding substantially uniform wall thicknesses. However the walls of the body 11 in the hemispherically rounded nose 15 and rear end portions 16 may be thickened somewhat in the axial region whereby a magnifying optical effect is obtained and the attractive power of the lure is enhanced.

More particularly, the forward portion 12 of the body 11 includes the rounded nose portion 15 and a relatively short section 18 of the central body portion 14 which section 18 is provided with an internally threaded proximal internally enlarged female end 19. The rearward body portion 13 includes the hemispherically rounded rear end portion 16 and a relatively longer section 20 of the central body portion 14 which section 20 is provided with an externally threaded constricted proximal male portion 21 adapted to engage the female end 19 of the forward body portion 12.

Preferably the hollow body portions 12 and 13 are molded of optically clear thermoplastic material such as one of the methyl acrylate plastics, and with a smooth surface finish in order to provide maximum visibility of inserts placed within the cavity 17. However, under certain conditions a frosted surface finish or a nodular external surface structure has been found effective. Moreover, such plastic may be tinted in certain shades to produce an enhanced attractive effect under appropriate lighting conditions.

For attaching the lure to a fishing line, swivel means 22 may be attached to the forward body portion 12 as by providing the threaded hole 23 in the rounded nose portion 15, along the longitudinal axis thereof, if a relatively stable motion of the plug body 11 is desired, or, offset, if an erratic and darting motion is to be obtained. Such swivel means 22 may include the wire eye portion 24 attached to the swivel barrel 25 and the proximal wire line extension 26 thereof wrapped around and soldered to the threaded rod 27 which may be inserted into the threaded hole 23 thereby to attach the swival means 22 to the lure body 11. Preferably a washer 28 is placed around the threaded rod 27 to receive the bearing pressure exerted by the proximal end 29 of the swivel wire 26 wrapped thereon as the threaded rod 27 is tightened.

Figures 2, 6:
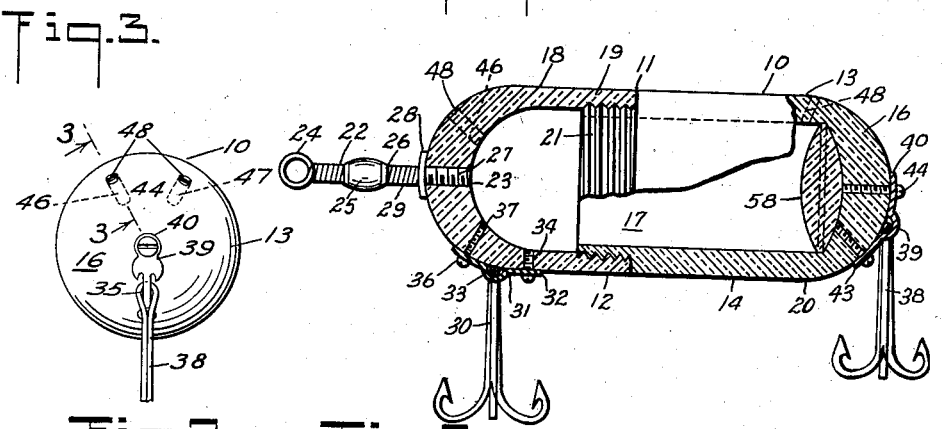
Figure 2 is a rear end view of the lure of Figure 1.
Figure 6 is a fragmentary vertical sectional view of a further modification of the fishing lure of my invention.

Means for attaching fish hooks to the body may be provided as illustrated in Figures 1 and 2. The forward hook 30 may be attached by a hook mounting bracket 31 formed as of a thin strip of metal with the enlarged end portions 32 and a constricted central portion 33 which end portions 32 are provided with perforations 34 and which constricted portion 33 is bent outwardly to accommodate the eye 35 of the hook 30; said bracket 31 being attached at a bottom position to the forward body portion 12 by screws 36 inserted through perforations 34 and engaging threaded holes 37 longitudinally spaced along the rounded nose portion 15 thereof.

Similarly a rear hook 38 may be attached to the rearward body portion 13 to enhance the fish hooking characteristics of the lure as by providing a rear hook mounting bracket 39 formed with enlarged end portions 40, outwardly bent constricted central portion 41 adapted to receive the eye 42 of the hook 38 and with perforations 43 formed in the enlarged end portion 40; said hook mounting bracket being attached at a bottom position to the rounded rear end portion 16 by screws 44 inserted through perforations 43 and engaging threaded holes 45 longitudinally spaced therein. Preferably one of said holes 45 is disposed concentric with or near the longitudinal axis of the hemispherical end 16 so as to bring the hook 38 into the more effective hooking position near the end of the lure body 11.

As it is desirable to provide circulation of water through the cavity 17 in order to keep natural aquatic baits alive and to render the plug body 11 less transparent, I provide a number of threaded holes 46 perforating the walls of the forward body portion 12 and threaded holes 47 perforating the walls of the rearward portion 13 of the body 11. Preferably such holes 46 and 47 are situated in the rounded portions 15 and 16, respectively, to provide the maximum flow of water therethrough. Also there may be employed plugs 48 to close the holes 46 and 47 to render the plug body 11 more buoyant whereby the lure 10 may be employed as a surface plug or to protect easily destructible inserts.

Figure 5:
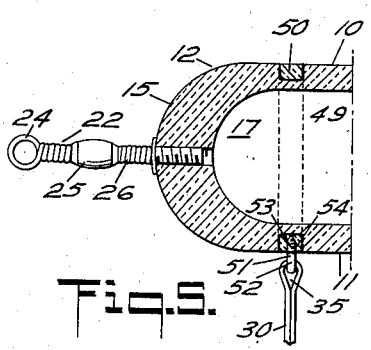
Figure 5 is a vertical longitudinal sectional view of the front portion of the lure illustrated in Figure 4.

Alternative means may be provided as illustrated in Figures 4 and 5 for attaching hooks to the body 11 of my fishing lure. As shown therein the forward hook 30 may be attached by providing a rectangular groove 49 girdling the circumference of the relatively short central body portion 18 and disposing therein a split ring 50 of rectangular cross section and attaching the hook 30 thereto by a screw eye 51 the eye portion 52 of which engages the eye 35 thereof and the screw portion 53 of which engages a threaded hole 54 formed in the ring 50.

Similarly, the rear hook 38 may be attached by providing a rectangular groove girdling the circumference of the relatively long portion 20 of the central body portion 14 and disposing therein a split ring 56 of rectangular cross section and attaching the hook 38 thereto by the screw eye 57.

In using my fishing lure I have found that a large variety of materials are effective as attractive inserts therein, and that a very considerable latitude and flexibility of adaption is obtainable.

For example, the lure is quite effective as an underwater plug when the holes are opened to allow entry and circulation of water through the cavity and with a live minnow, goldfish or other live aquatic bait employed, and the lure is trolled. Even when the lure is stationary and a live minnow or goldfish is employed therein the fish strike my lure with sufficient gusto to produce a high hooking efficiency as the movements of such fish within the lure cause incident light to flash about and attract the fish.

Inanimate inserts such as crumpled metal foils, silvered glass chips, fluorescent coated materials, mercury globules and other materials are effective particularly when the offset position of the swiveled attachment is employed in trolling to impart the weaving darting action.

When trolled underwater the plug may be weighted within the cavity (a silvered weight may also be employed therein) to eliminate the necessity of using external sinkers which tend to detract or repel wary game fish.

In the buoyant state of the lure it may be employed as a surface plug either for trolling or for casting with similar inserts as are employed in underwater operation.

A frosted surface condition which may be provided by sand blasting or which sometimes results when the lure is trolled over a sharp sandy bottom is also effective as the appearance of the plug surface when under water is not unlike that of a silvery minnow.

Magnifying optical effects may readily be produced to enhance the attractivity of the lure. As noted above, the non-uniform end wall thickness acts as a magnifying optical system. Such magnification tends through enhanced flashes of light from the lure to create and enhance the "action" of the lure.

Moreover, the nodular wall structure noted above, is rather effective as the multiple flashes created thereby create the effect of a violent movement on the part of the bait with only relatively slight initial movement. Apparently game fish react energetically to such violent movement as even the wary and wily larger fish attack the lure energetically.

With respect to optical magnifying effects a quite successful modification of the lure involves the employment of a double convex lens 58 installed as by cementing to the inner walls of the cavity and axially aligned therewith. Fish approaching the lure from the rear along the axis appear to be encouraged to strike the lure more violently when the lure is trolled than when such lens is not employed.

I claim:

A fishing plug lure comprising an elongated hollow body formed of transparent thermoplastic material including a forward body portion separably joined to a rearward body portion whereby fish attractive inserts may be disposed within the single cavity formed in said body, said body having substantially hemispherical rounded end portions, a double convex lens disposed within the hollow cavity substantially immediately adjacent said end portions of said body and in axial alignment therewith, said body further being provided with closable ports for allowing entry and circulation of water entirely through said cavity, swivel means attached to the nose of said forward body portion for attaching a fishing line thereto, means for attaching fish hooks associated with said forward and rearward body portions, and fish hooks attached by said means.

LEON L. BRADBERRY.

References Cited in the file of this patent
UNITED STATES PATENTS

| Number | Name | Date |
|---|---|---|
| 671,613 | Shakespeare | Apr. 9, 1901 |
| 1,089,074 | Pfeiffer | Mar. 3, 1914 |
| 2,112,385 | Smith | Mar. 29, 1938 |
| 2,241,941 | Bates | May 13, 1941 |
| 2,439,123 | Bell | Apr. 6, 1948 |
| 2,467,971 | Frair | Apr. 19, 1949 |
| 2,592,445 | McCarthy | Apr. 8, 1952 |